(12) United States Patent
Ikegaya et al.

(10) Patent No.: US 7,739,371 B2
(45) Date of Patent: *Jun. 15, 2010

(54) COMPUTER SYSTEM

(75) Inventors: Naoko Ikegaya, Sagamihara (JP); Nobuhiro Maki, Sagamihara (JP); Yuri Hiraiwa, Sagamihara (JP); Katsuhisa Miyata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/277,668

(22) Filed: Nov. 25, 2008

(65) Prior Publication Data

US 2009/0094255 A1 Apr. 9, 2009

Related U.S. Application Data

(63) Continuation of application No. 10/921,344, filed on Aug. 19, 2004, now Pat. No. 7,467,234.

(30) Foreign Application Priority Data

Jun. 9, 2004 (JP) ............................. 2004-171059

(51) Int. Cl.
G06F 15/173 (2006.01)
(52) U.S. Cl. ...................................... 709/223; 709/248
(58) Field of Classification Search ................. 709/223, 709/248; 711/147
See application file for complete search history.

(56) References Cited

U.S. PATENT DOCUMENTS

| 4,881,074 A | 11/1989 | Reichbauer et al. |
| 5,892,937 A | 4/1999 | Caccavale |
| 6,081,875 A | 6/2000 | Clifton et al. |
| 6,196,735 B1 | 3/2001 | Inamine |
| 6,393,528 B1 | 5/2002 | Arimilli et al. |
| 6,438,110 B1 | 8/2002 | Rai et al. |

(Continued)

FOREIGN PATENT DOCUMENTS

EP 0869438 3/1998

(Continued)

OTHER PUBLICATIONS

Remote Storage Disk Control Device and Method for Controlling the Same, pp. 1-51 Fig. 14.

(Continued)

*Primary Examiner*—Salad Abdullahi
(74) *Attorney, Agent, or Firm*—Antonelli, Terry, Stout & Kraus, LLP.

(57) ABSTRACT

In a computer system, to enable a second computer to take over control of copying of data within the computer system, from a first computer that normally controls copying of data.

The second computer selects from a plurality of storage systems a storage system to be accessed in order to acquire sub system pair information, and acquires sub system pair information from the selected storage system. Based on the acquired sub system pair information, the second computer generates system pair information that includes copy pair information relating to a plurality of storage areas belonging to the plurality of storage systems. The second computer initially selects a storage system directly linked to the second computer, and subsequently sequentially selects a storage system based on the acquired sub system pair information.

9 Claims, 14 Drawing Sheets

U.S. PATENT DOCUMENTS

| | | |
|---|---|---|
| 6,453,354 B1 | 9/2002 | Jiang et al. |
| 6,457,109 B1 | 9/2002 | Milillo et al. |
| 6,484,187 B1 | 11/2002 | Kern et al. |
| 6,526,419 B1 | 2/2003 | Burton et al. |
| 6,529,944 B1 | 3/2003 | LeCrone |
| 6,529,994 B1 | 3/2003 | Bleidt et al. |
| 6,543,001 B2 | 4/2003 | LeCrone et al. |
| 6,587,935 B2 | 7/2003 | Ofek |
| 6,591,351 B1 | 7/2003 | Urabe et al. |
| 6,611,903 B2 | 8/2003 | Fujimoto et al. |
| 6,631,477 B1 | 10/2003 | LeCrone et al. |
| 6,658,540 B1 | 12/2003 | Sicola et al. |
| 6,681,392 B1 | 1/2004 | Henry et al. |
| 6,701,455 B1 | 3/2004 | Yamamoto et al. |
| 6,862,632 B1 | 3/2005 | Halstead et al. |
| 6,974,391 B2 | 12/2005 | Ainsworth et al. |
| 2001/0007102 A1 | 7/2001 | Gagne et al. |
| 2002/0004890 A1 | 1/2002 | Ofek et al. |
| 2002/0018446 A1 | 2/2002 | Huh et al. |
| 2002/0078296 A1 | 6/2002 | Nakamura et al. |
| 2002/0103968 A1 | 8/2002 | Grover |
| 2002/0112079 A1 | 8/2002 | Yamamoto |
| 2002/0178336 A1 | 11/2002 | Fujimoto et al. |
| 2002/0194428 A1 | 12/2002 | Green |
| 2003/0078903 A1 | 4/2003 | Kimura et al. |
| 2003/0093597 A1 | 5/2003 | Marshak et al. |
| 2003/0093635 A1 | 5/2003 | Yoder et al. |
| 2003/0105931 A1 | 6/2003 | Weber et al. |
| 2003/0159058 A1* | 8/2003 | Eguchi et al. ............... 713/193 |
| 2003/0163553 A1 | 8/2003 | Kitamura et al. |
| 2003/0163619 A1 | 8/2003 | Saito |
| 2003/0229764 A1 | 12/2003 | Ohno et al. |
| 2004/0073831 A1 | 4/2004 | Yanai et al. |
| 2004/0098547 A1 | 5/2004 | Ofek et al. |
| 2004/0103254 A1 | 5/2004 | Satoyama et al. |
| 2004/0158652 A1 | 8/2004 | Obara |
| 2005/0060505 A1 | 3/2005 | Kasako et al. |
| 2005/0060507 A1 | 3/2005 | Kasako et al. |
| 2007/0061616 A1* | 3/2007 | Watanabe ..................... 714/6 |

FOREIGN PATENT DOCUMENTS

| | | |
|---|---|---|
| EP | 1024439 A | 8/2000 |
| JP | 8-137772 A | 5/1996 |
| JP | 2002-189570 | 7/2002 |
| JP | 2002-334049 | 11/2002 |
| JP | 2002-542526 | 12/2002 |
| JP | 2003-223349 | 8/2003 |
| JP | 2004-13367 | 1/2004 |
| WO | WO 00/49500 | 8/2000 |

OTHER PUBLICATIONS

Remote Storage Disk Control Device with Function to Transfer Commands to Remote Storage Devices, pp. 1-86 . . . Fig. 1-28.

* cited by examiner

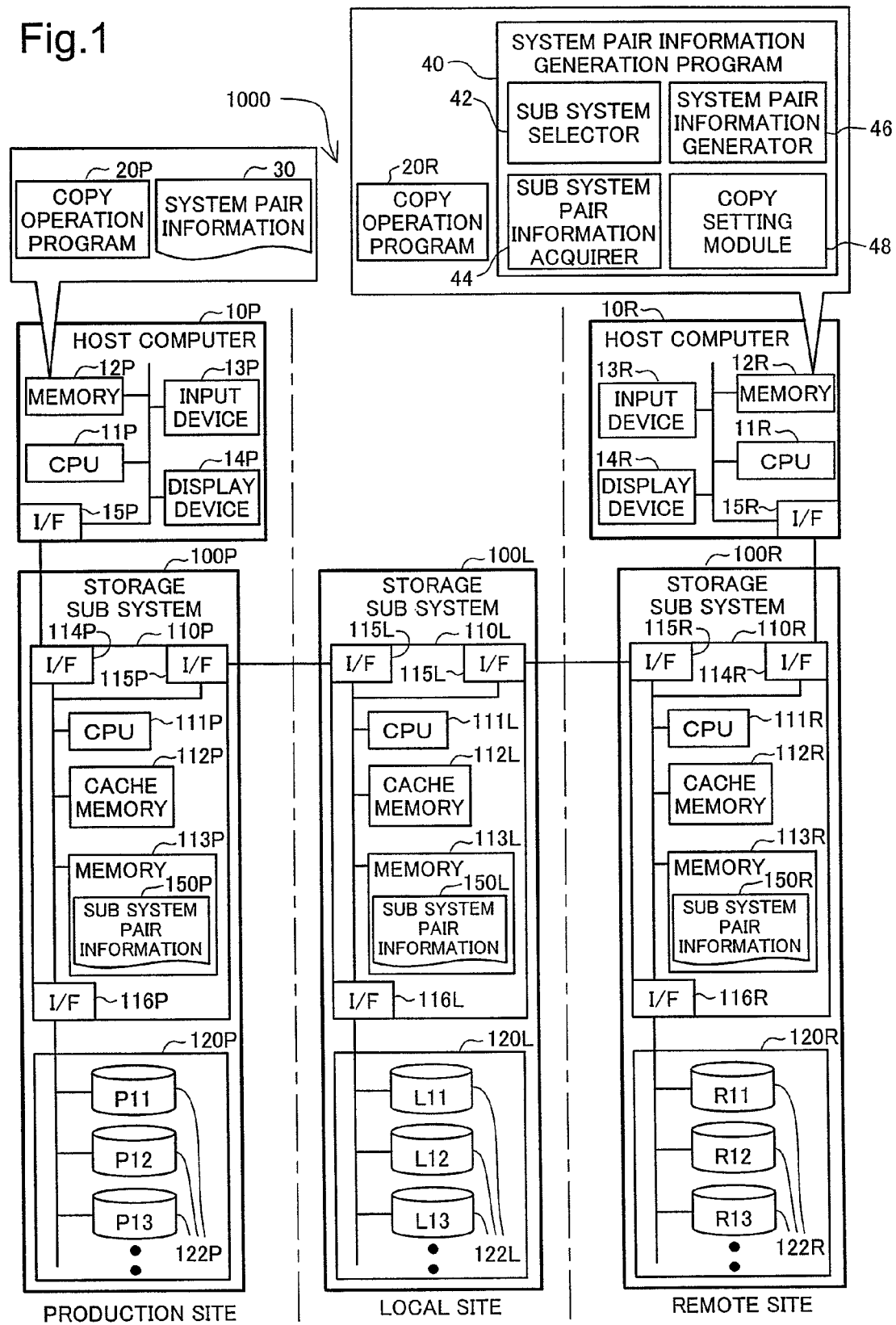

| PAIR NUMBER | VOLUME 1 | | VOLUME 2 | | REMARKS |
|---|---|---|---|---|---|
| | STORAGE SUB SYSTEM IDENTIFIER | VOLUME IDENTIFIER | STORAGE SUB SYSTEM IDENTIFIER | VOLUME IDENTIFIER | (COPY STATUS INFORMATION COPY TYPE INFORMATION COPY DIRECTION INFORMATION) |
| Pr-1 | 100P | P11 | 100L | L11 | |
| Pr-2 | 100L | L11 | 100L | L12 | |
| Pr-3 | 100L | L12 | 100R | R12 | |
| Pr-4 | 100R | R12 | 100R | R11 | |

| PAIR NUMBER | VOLUME 1 | | VOLUME 2 | | REMARKS |
|---|---|---|---|---|---|
| | STORAGE SUB SYSTEM IDENTIFIER | VOLUME IDENTIFIER | STORAGE SUB SYSTEM IDENTIFIER | VOLUME IDENTIFIER | (COPY STATUS INFORMATION COPY TYPE INFORMATION COPY DIRECTION INFORMATION) |
| Pr-1 | 100P | P11 | 100L | L11 | |

| PAIR NUMBER | VOLUME 1 | | VOLUME 2 | | REMARKS |
|---|---|---|---|---|---|
| | STORAGE SUB SYSTEM IDENTIFIER | VOLUME IDENTIFIER | STORAGE SUB SYSTEM IDENTIFIER | VOLUME IDENTIFIER | (COPY STATUS INFORMATION COPY TYPE INFORMATION COPY DIRECTION INFORMATION) |
| Pr-1 | 100P | P11 | 100L | L11 | |
| Pr-2 | 100L | L11 | 100L | L12 | |
| Pr-3 | 100L | L12 | 100R | R12 | |

| PAIR NUMBER | VOLUME 1 | | VOLUME 2 | | REMARKS |
|---|---|---|---|---|---|
| | STORAGE SUB SYSTEM IDENTIFIER | VOLUME IDENTIFIER | STORAGE SUB SYSTEM IDENTIFIER | VOLUME IDENTIFIER | (COPY STATUS INFORMATION COPY TYPE INFORMATION COPY DIRECTION INFORMATION) |
| Pr-3 | 100L | L12 | 100R | R12 | |
| Pr-4 | 100R | R12 | 100R | R11 | |

Fig.7A

ROUTING INFORMATION

| STORAGE SUB SYSTEM IDENTIFIER: 100R |
|---|

Fig.7B

ROUTING INFORMATION

| STORAGE SUB SYSTEM IDENTIFIER: 100R |
|---|
| STORAGE SUB SYSTEM IDENTIFIER: 100L |

Fig.7C

ROUTING INFORMATION

| STORAGE SUB SYSTEM IDENTIFIER: 100R |
|---|
| STORAGE SUB SYSTEM IDENTIFIER: 100L |
| STORAGE SUB SYSTEM IDENTIFIER: 100P |

| GROUP NUMBER | NUMBER OF PAIRS | PAIR NUMBER | VOLUME 1 | | VOLUME 2 | | REMARKS (COPY STATUS INFORMATION / COPY TYPE INFORMATION / COPY DIRECTION INFORMATION) |
|---|---|---|---|---|---|---|---|
| | | | STORAGE SUB SYSTEM IDENTIFIER | VOLUME IDENTIFIER | STORAGE SUB SYSTEM IDENTIFIER | VOLUME IDENTIFIER | |
| Gr-1 | 2 | Pr-1 | 100P1 | P11 | 100L1 | L11 | |
| | | Pr-11 | 100P2 | P21 | 100L2 | L21 | |
| Gr-2 | 2 | Pr-2 | 100L1 | L11 | 100L1 | L12 | |
| | | Pr-12 | 100L2 | L21 | 100L2 | L22 | |
| Gr-3 | 2 | Pr-3 | 100L1 | L12 | 100R1 | R12 | |
| | | Pr-13 | 100L2 | L22 | 100R2 | R22 | |
| Gr-4 | 2 | Pr-4 | 100R1 | R12 | 100R1 | R11 | |
| | | Pr-14 | 100R2 | R22 | 100R2 | R21 | | ns
COMPUTER SYSTEM

CROSS REFERENCE TO RELATED APPLICATIONS

This application is a continuation of U.S. application Ser. No. 10/921,344, filed Aug. 19, 2004 now U.S. Pat. No. 7,467,234, and Japanese Patent Application No. JP2004-171059 filed on Jun. 9, 2004, and U.S. patent application Ser. No. 10/788,453 filed on Mar. 1, 2004 (now U.S. Pat. No. 7,380,078) are incorporated herein by reference in its entirety.

BACKGROUND

The present invention relates to a computer system and control technique of it, and in particular to a technique for controlling copying of data among storage areas of storage sub systems by means of a secondary computer belonging to a computer system.

In recent years, in computer systems comprising a host computer and a storage sub system for storing data, it has become common practice to use remote copy technology in order to improve data reliability. Remote copy technology is a technology whereby a multiplicity of storage sub systems are set up within a computer system, with data stored in a storage area in one storage sub system being copied to a storage area in another storage sub system. According to this remote copy technology, even in the event that a malfunction occurs in one storage sub system rendering it inoperable, the computer system can nevertheless continue to carry out tasks using data held in another storage sub system.

Another technique for improving reliability of data in computer systems is to sequentially link a multitude of storage sub systems to a host computer, and perform remote copying of data to the sequentially linked storage sub systems in order to increase data multiplicity (redundancy), so as to enhance data reliability (e.g. JP2000-293674A).

Copying of data within a computer system is typically carried out by defining a copy pair composed of two storage areas, and copying data from one storage area of the copy pair to the other storage area. Where data is copied within a single storage sub system, the copy pair will be composed of two storage areas belonging to one storage sub system. Where remote copying is to be performed, the copy pair will be composed of two storage areas belonging to two different storage sub systems. Information relating to such copy pairs is generally generated and held by the host computer.

SUMMARY

In a computer system of this kind, in the event that a malfunction due to some cause occurs in the host computer, rendering the host computer inoperable, it is expected that tasks can continue to be carried out. For this reason, in some instances a second host computer separate from the host computer (first host computer) that normally controls tasks in the computer system is connected to the storage sub systems.

However, since the second host computer does not hold information relating to copy pairs, while the second host computer can exchange data with storage sub systems to which it is connected directly, the second host computer cannot take over control of data copying within the computer system. A resultant problem is that in the event that the first host computer is unable to execute control of the computer system, it is difficult for the second host computer take over from the first host computer control of data copying within the computer system.

It is an object of one embodiment of the invention to provide a technique whereby it is possible for a second host computer in a computer system to take over control of data copying within the computer system.

In one aspect of the present invention, there is provided a computer system which comprises a first computer, a plurality of storage systems serially linked to the first computer, and a second computer linked to at least one of the plurality of storage systems. Each of the plurality of storage systems includes at least one storage area for storing data. There is established at least one copy pair which is a combination of two storage areas among a plurality of storage areas belonging to the plurality of storage systems. Copying of data is to be carried out among the two storage areas of the copy pair. The first computer has stored in advance therein system pair information including copy pair information that defines the copy pair. Each of the storage systems stores sub system pair information including copy pair information that defines a copy pair in which at least one of the two storage areas making up the copy pair is a storage area within the storage system in question. The second computer includes a sub system selector configured to select from among the plurality of storage systems a storage system to be accessed in order to acquire the sub system pair information, a sub system pair information acquirer configured to acquire the sub system pair information belonging to the selected storage system, and a system pair information generator configured to generate, based on the acquired sub system pair information, system pair information that includes copy pair information relating to a plurality of storage areas belonging to the plurality of storage systems. During the generation of system pair information by the second computer, the sub system selector initially selects a storage system directly linked to the second computer, and after performing initial acquisition of sub system pair information by means of the sub system pair information acquirer, sequentially selects a storage system to be accessed, based on the acquired sub system pair information.

With this computer system, the second computer sequentially executes selection of a storage sub system and acquisition of sub system pair information from the selected storage sub system. Based on the acquired sub system pair information, the second computer is able to generate copy pair information relating to a multiplicity of storage areas disposed in a multiplicity of storage sub systems. Thus, using the generated system pair information, the second computer is able to take over control of data copying in the computer system from the first computer that normally controls copying of data.

The present invention can be realized in various aspects. For example, the present invention can be realized in aspects such as a computer system, a computer, a storage subsystem, a storage method and device, a storage control method and device, a system pair information generating method and device, a computer program for realizing the functions of these methods or devices, a computer program set including such a computer program, a computer readable medium or a recording medium on which such a computer program is recorded, and a data signals in which such a computer program is realized in a carrier wave.

Where the invention is provided as a computer program or recording medium on which such a computer program is recorded, an arrangement whereby the program controls operation of the entire computer system is possible, as is an arrangement whereby the program controls operation of the computer and each storage subsystem.

The above and other objects, characterizing features, aspects and advantages of the present invention will be clear from the description of preferred embodiments presented below along with the attached drawings.

BRIEF DESCRIPTION OF THE DRAWINGS

FIG. 1 is a block diagram showing arrangement of a computer system in Embodiment 1.

FIGS. 3A-3C illustrate an example of sub system pair information.

FIGS. 7A-7C illustrate an example of routing information.

DESCRIPTION OF THE PREFERRED EMBODIMENT

Figures 2A, 2B:
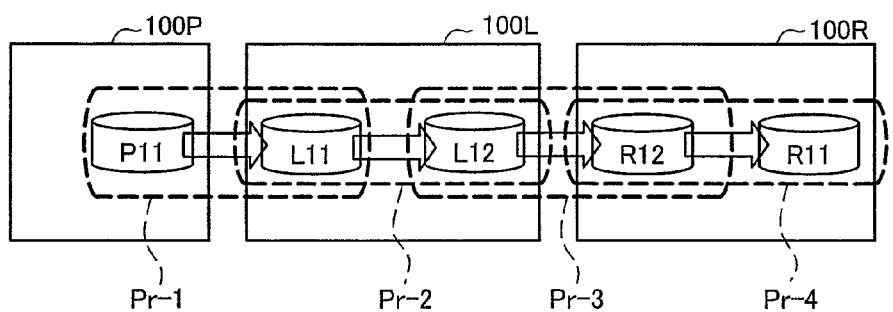
FIGS. 2A-2B illustrate an example of system pair information.

The embodiment of the invention is described in the following order.

A. Embodiment 1:

A-1. Arrangement of Computer System:

A-2. Copying of Data in Computer System:

A-3. Generation of System Pair Information by Secondary Host Computer:

B. Embodiment 2:

C. Embodiment 3:

D: Variations

A. Embodiment 1

A-1. Arrangement of Computer System

FIG. 1 is a block diagram showing arrangement of a computer system in Embodiment 1. The computer system 1000 of Embodiment 1 comprises a host computer 10P as a first computer, a host computer 10R as a second computer, and storage sub systems 100P, 100L, 100R.

The host computer 10P and the storage sub system 100P are situated at a production site at which data processing activities are carried out. The storage sub system 100L is situated at a local site in proximity to the production site. The host computer 10R and the storage sub system 100R are situated at a remote site away from the production site.

Herein, a symbol identifying the site at which an element is located is suffixed to symbols indicating host computers and storage sub systems proper, component elements, and various kinds of information and programs. That is, the symbol "P" suffixed to a symbol indicates that the element is located at the production site, an "L" that it is located at a local site, and an "R" that it is located at a remote site, respectively. Additionally, in the description herein, in instances where it is not necessary to distinguish among individual host computers, individual storage sub systems or the like, the site symbol suffix may be omitted.

The host computer 10P at the production site is connected to the storage sub system 100P at the production site. The host computer 10R at the remote site is connected to the storage sub system 100R at the remote site. The storage sub system 100P at the production site and the storage sub system 100R at the remote site are each connected to the storage sub system 100L at the local site. Herein, a state of being directly connected without any other intervening storage sub system 100, as are the host computer 10P and storage sub system 100P, is termed "direct linkage." A storage sub system 100 directly linked to a host computer 10, like storage sub system 100P or storage sub system 100R, is termed a "directly linked storage sub system."

As described above, the computer system 1000 of this Embodiment is a system in which storage sub systems (100P, 100L, 100R) situated at each site (production site, local site, remote site) are connected in series, with the two end storage sub systems (100P and 100R) directly linked to the respective host computers (10P and 10R). In this computer system 1000, host computer 10P can perform remote copying of data stored in the storage sub system 100P at the production site to a storage sub system 100 at another site (local site or remote site). By means of such remote copying, it is possible to have a given set of data held in a storage sub systems 100 situated at a number of geographically remote sites, making it possible to improve reliability of data.

The production site host computer 10P (hereinafter termed the "primary host computer 10P") normally administers all of the storage sub systems 100 in the computer system 1000, and executes data processing tasks. For example, primary host computer 10P carries out exchange of data with the storage sub system 100P directly linked to primary host computer 10P, as well as carrying out operations and settings of various kinds for the purpose of remote copying of data stored in storage sub system 100P to other storage sub systems 100.

The host computer 10R at the remote site (hereinafter termed the "secondary host computer 10R") does not normally execute any processes, but can take over data processing tasks from the primary host computer 10P. For example, in the event of a malfunction of the primary host computer 10P, the secondary host computer 10R would administer all of the storage sub systems 100 in the computer system 1000, and carry out data processing tasks.

Host computer 10 comprises a CPU 11, memory 12, input device 13, display device 14, and interface (I/F) 15 for connecting to storage sub systems 100.

Storage sub system 100 is a system for storing data, outputting data, and so on in association with data processing tasks performed by host computer 10. Storage sub system 100 comprises a storage controller 110 and a disk array 120.

Storage controller 110 is a device for carrying out control of storage sub system 100. Storage controller 110 comprises a CPU 111, cache memory 112 for temporary storage of data sent from a host computer 10, memory 113, an interface (I/F)

114 for connecting to a host computer 10, an interface (I/F) 115 for connecting to another storage sub system 100, and an interface (I/F) 116 for connecting to a disk array 120.

Disk array 120 is a storage device employing a plurality of disk devices, and comprises at least one volume 122. Volume 122 is a storage area for storage of data that is used in data processing tasks by host computer 10. Ordinarily, a single volume 122 is generated by logical partitioning of a single logical storage area formed by a plurality of disk devices.

Memory 12P of primary host computer 10P contains a copy operation program 20P and system pair information 30. By executing the copy operation program 20P, the primary host computer 10P performs copy operations on data stored in storage sub systems 100 in computer system 1000. Data copy operations include copy settings for setting the data copy method, data copy start and stop operations, and the like.

System pair information 30 includes copy pair information defining copy pairs for all copy pairs in the computer system 1000. Here, a copy pair refers to a combination of two volumes 122 between which is copied data stored in volumes 122. That is, data stored in one of the volumes 122 constituting a copy pair is copied to the other volume 122 constituting the copy pair. By means of copying data within a copy pair, there can be generated a situation in which two sets of data of given content exist. A copy pair can be composed of two volumes situated in a single storage sub system 100, or composed of two volumes divided among two storage sub systems 100.

A copy pair is defined by copy pair information. Copy pair information contains a storage sub system 100 identifier and a volume 122 identifier, for respectively identifying each of the two volumes 122 making up the copy pair.

FIGS. 2A-2B illustrate an example of system pair information. FIG. 2A shows exemplary contents of system pair information 30. Each row of system pair information 30 shown in FIG. 2A shows a copy pair made up of two volumes 122 (Volume 1 and Volume 2) identified by a storage sub system identifier and a volume identifier. That is, each row of system pair information 30 constitutes copy pair information defining a copy pair. For example, the first row of system pair information 30 shows that a copy pair of pair number Pr-1 is composed of the volume 122 whose volume identifier is P11 stored in storage sub system 100P, and the volume 122 whose volume identifier is L11 stored in storage sub system 100L. Herein, a volume 122 whose identifier is "X" will be denoted as "X Volume." For example, copy pair Pr-1 is represented as being composed of the P11 volume and the L11 volume.

System pair information 30 includes copy pair information defining all copy pairs in the computer system 1000. In the computer system 1000 of this Embodiment, four copy pairs are defined by the four sets of copy pair information included in the system pair information 30 shown in FIG. 2A. In FIG. 2B, the four copy pairs (Pr-1 to Pr-4) defined by the system pair information 30 are shown enclosed by broken lines.

Each set of copy pair information included in system pair information 30 (FIG. 2A) contains copy status information, copy type information, and copy direction information. Here, copy status information is information indicating the state of progress of copying, i.e. whether copying within the copy pair has completed, or whether copying is currently being performed. Copy type information is information indicating copy type, i.e. a synchronous copy versus an asynchronous copy, or a total copy versus a differential copy. Copy direction information is information indicating a copy direction, i.e. which volume 122 in the copy pair is the copy source and which volume 122 is the copy destination. Synchronous copying refers to a situation in which when data stored in the copy source volume 122 of a copy pair is updated, copy of the data within the copy pair is carried out synchronously therewith. Asynchronous copying, on the other hand, refers to a situation in which when data stored in the copy source volume 122 of a copy pair is updated, copy of the data within the copy pair is not carried out synchronously therewith, but rather at some other selected timing. Total copying refers to copying data stored in the copy source volume 122 of a copy pair, in its entirety to the copy destination volume 122. Differential copying, on the other hand, refers to copy to the copy destination volume 122 only updated data from among the data stored in the copy source volume 122 of a copy pair.

In FIG. 2B, the copy direction of each copy pair is indicated by an arrow. In copy pair Pr-1, the P11 volume is the copy source and the L11 volume is the copy destination.

Herein, the method of making various settings for copies, such as copy type and copy direction defined by means of copy type information and copy direction information, is termed the "copy method", and setting of the copy method is termed "copy setting."

System pair information 30 is generated by the primary host computer 10P (FIG. 1) in accordance with an administrator instruction input from input device 13P. The system pair information 30 so generated is stored in a predetermined area of memory 12P.

In the memory 113 (FIG. 1) of the storage controller 110 in the storage sub system 100 at each site is stored sub system pair information 150. Sub system pair information 150 includes copy pair information defining a copy pair wherein at least one of the two volumes 122 making up the copy pair is a volume 122 within its own storage sub system 100. That is, a storage sub system 100 has, by way of sub system pair information 150, copy pair information defining all copy pairs that contain a volume 122 belonging to itself.

FIG. 3 is an illustration of an example of sub system pair information. FIG. 3A shows sub system pair information 150P belonging to storage sub system 100P (FIG. 1); FIG. 3B shows sub system pair information 150L belonging to storage sub system 100L (FIG. 1); and FIG. 3C shows sub system pair information 150R belonging to storage sub system 100R (FIG. 1).

As noted, the sub system pair information 150 belonging to an individual storage sub system 100 contains copy pair information defining all copy pairs contained in a volume 122 belonging to the storage sub system 100. For example, as shown in FIG. 2B, for storage sub system 100P, the P11 volume makes up a copy pair with the L11 volume of storage sub system 100L. Thus, the sub system pair information 150P (FIG. 3A) belonging to storage sub system 100P includes copy pair information defining that copy pair. Sub system pair information 150L and sub system pair information 150R belonging to storage sub system 100L and storage sub system 100R have analogous arrangements (FIGS. 3B and 3C). In FIGS. 3A-3B, for each set of sub system pair information 150, volumes within the storage sub system 100 holding the sub system pair information 150 are indicated by hatching. Like system pair information 30, sub system pair information 150 contains copy status information, copy type information, and copy direction information.

Sub system pair information 150 is generated by the primary host computer 10P (FIG. 1) for each storage sub system 100 on the basis of system pair information 30. Specifically, sub system pair information 150 for each storage sub system 100 can be generated by extracting from the system pair information 30 copy pair information defining all copy pairs contained in a volume 122 in the storage sub system 100. Sub system pair information 150 generated for each storage sub system 100 is stored in a predetermined area of memory 113 of each storage sub system 100.

In the memory 12R (FIG. 1) of the secondary host computer 10R are stored a copy operation program 20R and a system pair information generation program 40. The copy operation program 20R includes a function identical to the copy operation program 20P stored in memory 12P of the primary host computer 10P.

The system pair information generation program 40 is a program that is executed when the secondary host computer 10R generates system pair information. The system pair information generation program 40 has the functions of a sub system selector 42, a sub system pair information acquirer 44, a system pair information generator 46, and a copy setting module 48. Generation of system pair information by the secondary host computer 10R using these functions will be described in detail later.

A-2. Copying of Data in Computer System

The description now turns to copying of data in the computer system 1000 of this Embodiment. As noted, in the system 1000 of this Embodiment, the four copy pairs shown in FIG. 2A are defined by system pair information 30.

For example, when the primary host computer 10P (FIG. 1) issues a command to store data in the P11 volume of the production site storage sub system 100P, the storage controller 110P of storage sub system 100P initially stores the command in cache memory 112P, and then stores the data contained in the command in the P11 volume of disk array 120P.

When data is stored in the P11 volume, storage controller 110P makes reference to the sub system pair information 150P stored in memory 113P to verify that a copy pair contained in the P11 volume is defined. In this Embodiment, there is defined by sub system pair information 150P (FIG. 3A) a copy pair composed of the P11 volume and the L11 volume of the local site storage sub system 100L. At this time, the storage controller 110P generates a commend to copy the data stored in the P11 volume to the L11 volume of storage sub system 100L, and sends the command to the storage controller 110L of storage sub system 100L.

The storage controller 110L, upon receiving the command sent from storage controller 110P, initially stores the command in cache memory 112L, and then stores the data contained in the command in the L11 volume of disk array 120L. In this way, data identical to data stored in the P11 volume of storage sub system 100P is now stored in the L11 volume of storage sub system 100L.

Subsequently, by means of a similar process, copying is carried out in successive copy pairs; in the example of FIG. 2B, at the end identical data is stored in the R11 volume of the remote site storage sub system 100R.

In this way, computer system 1000 can store identical data in a plurality of volumes 122 within a single storage sub system 100, or in a plurality of volumes 122 situated in different storage sub systems 100. By so doing, computer system 1000 increases data multiplicity (redundancy) so as to enhance reliability.

A-3. Generation of System Pair Information by Secondary Host Computer

As noted, the secondary host computer 10R is able to take over from the primary host computer 10P administration of all of the storage sub systems 100 in the computer system 1000, and to execute data processing tasks. Since the secondary host computer 10R does not have system pair information that includes copy pair information defining copy pairs in the computer system 1000, the secondary host computer 10R generates system pair information when taking over data processing tasks from the primary host computer 10P.

Figure 4:
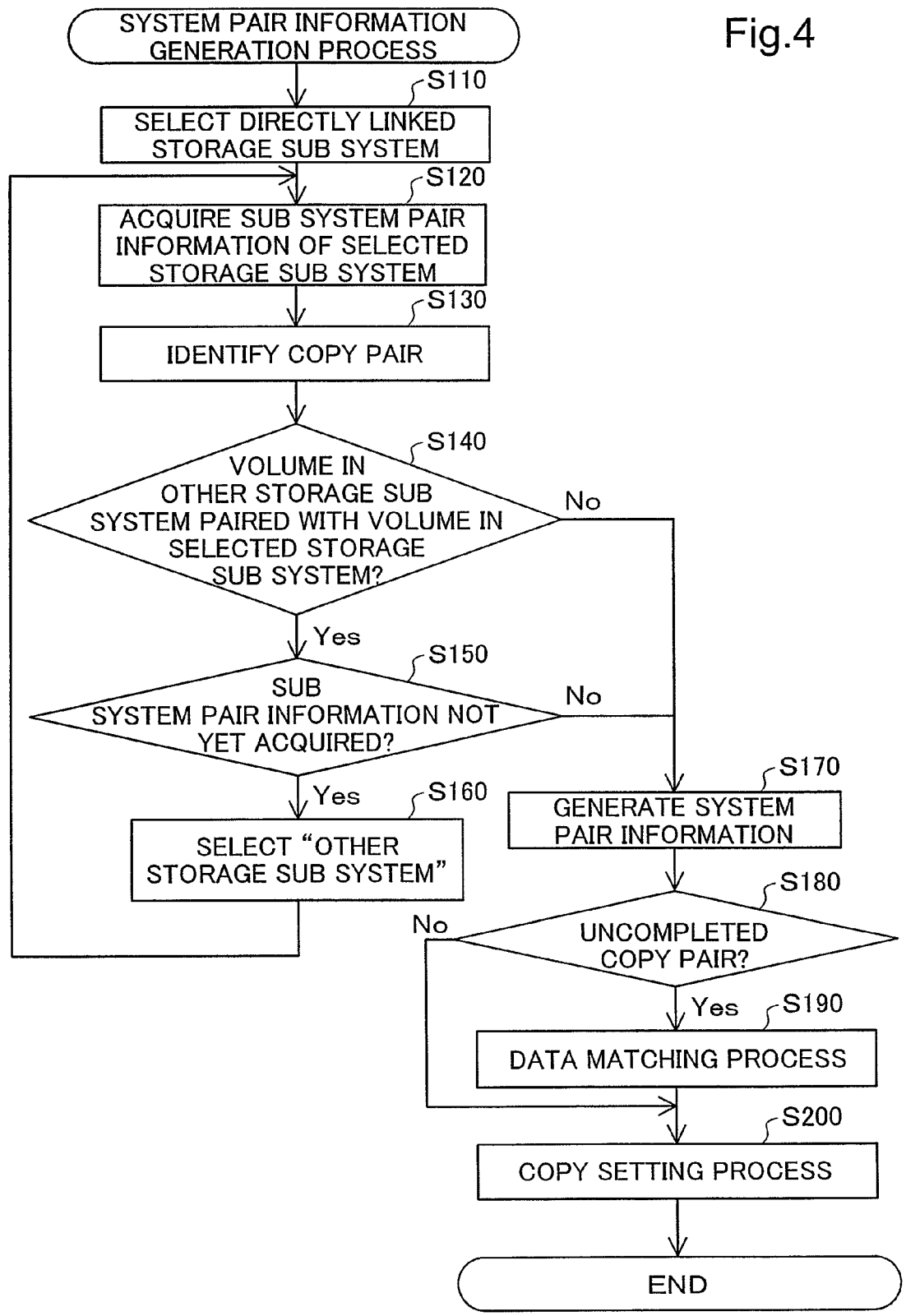
FIG. 4 is a flowchart showing the flow of a system pair information generation process by a secondary host computer.
Figure 5A:
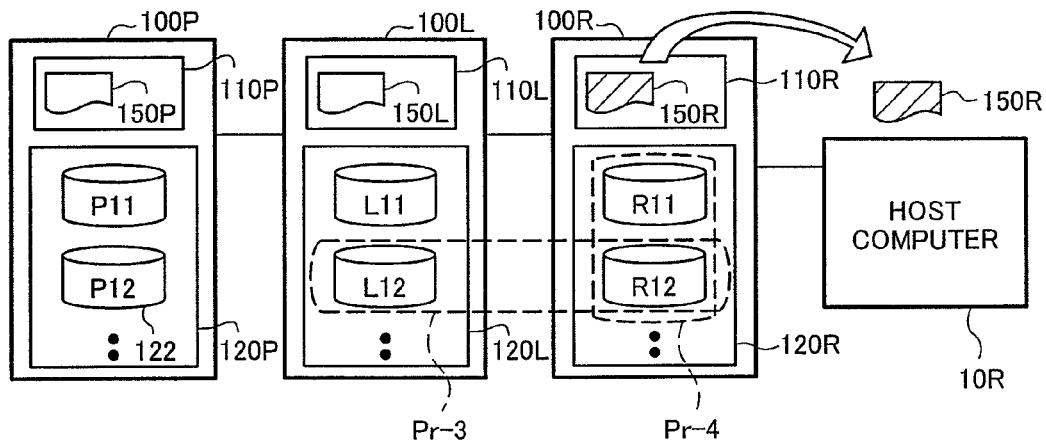
FIGS. 5A-5C illustrate a sub system pair information acquisition process by a secondary host computer.
Figure 5B:
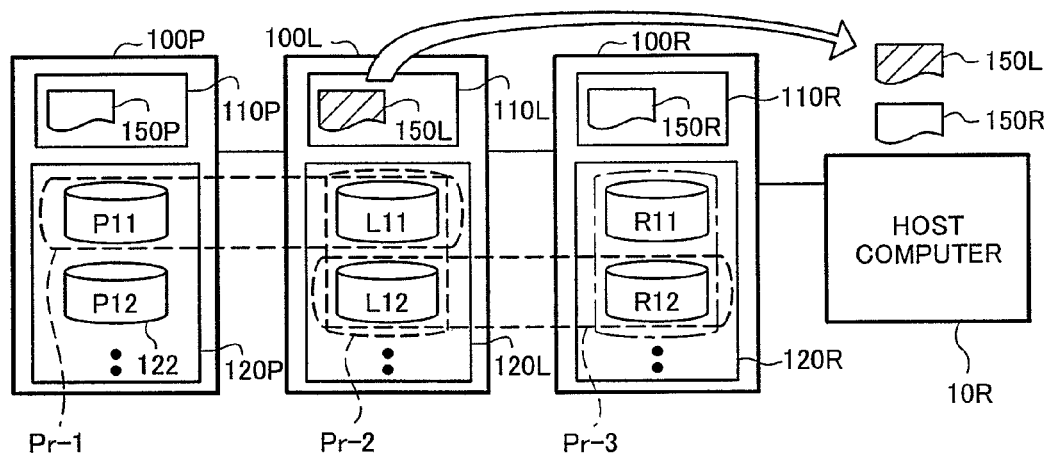
Figure 5C:
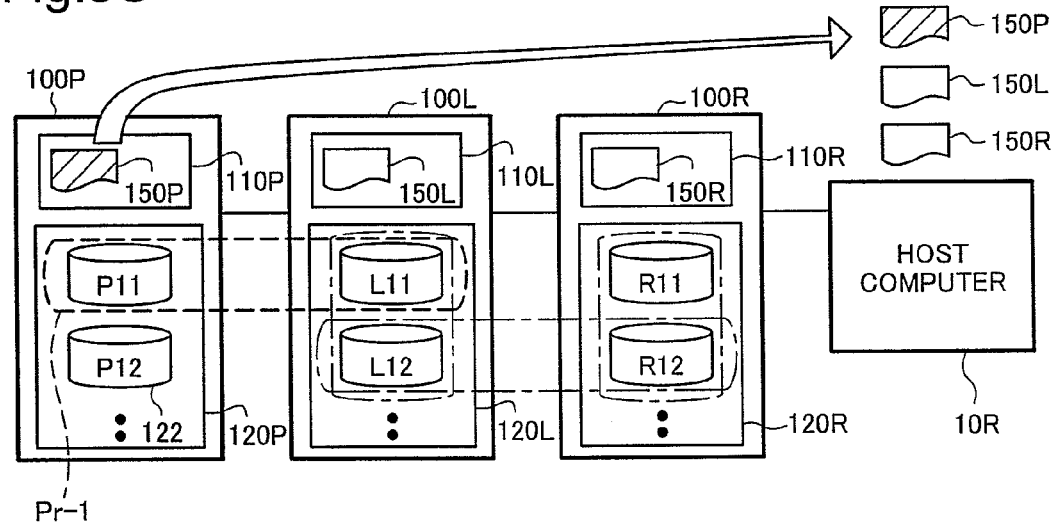
Figure 6A:
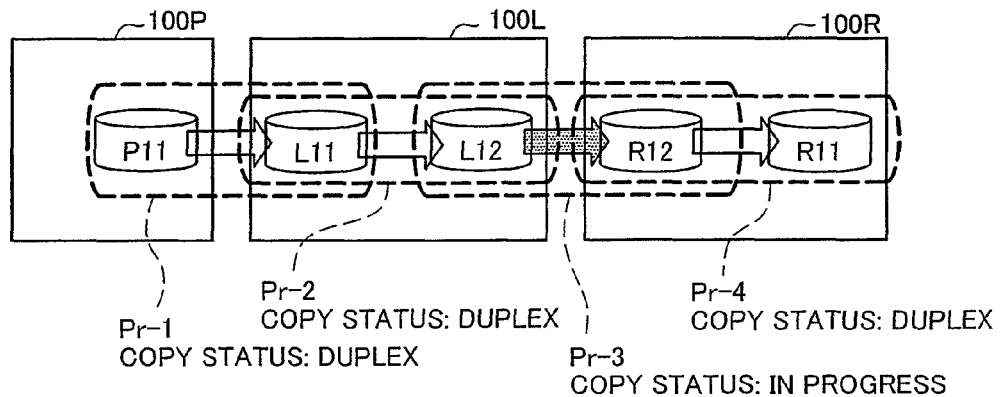
FIGS. 6A-6C illustrate a data matching process and copy setting process by a secondary host computer.
Figure 6B:
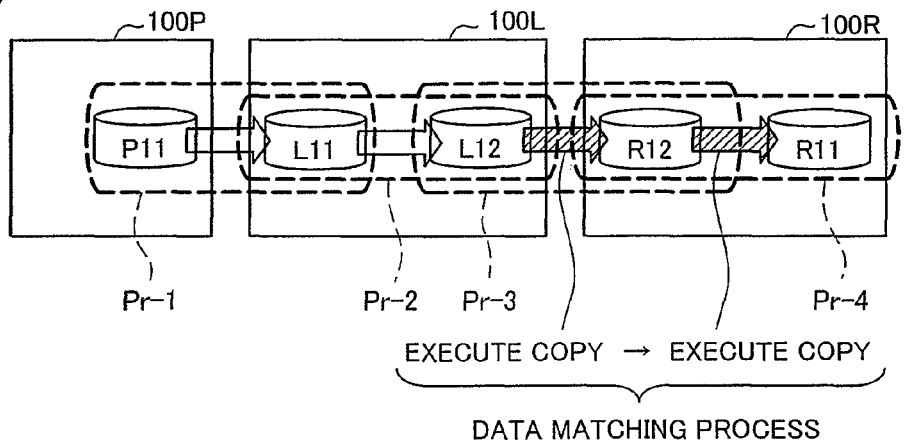
Figure 6C:
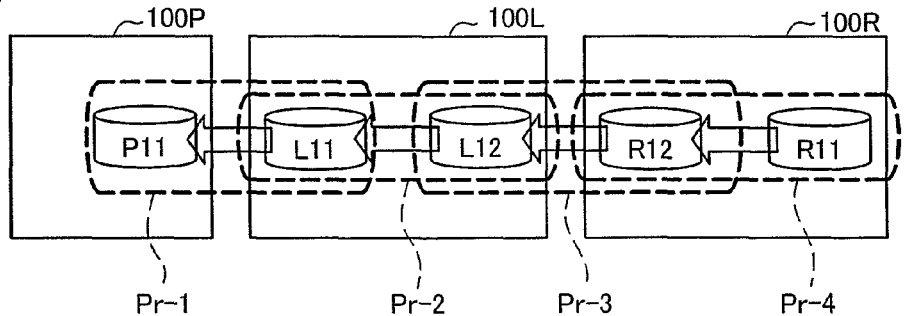

The following description of generation of system pair information 30 by secondary host computer 10R makes reference to FIGS. 4 to 6. FIG. 4 is a flowchart showing the flow of a system pair information generation process by a secondary host computer. FIGS. 5A-5C illustrate a sub system pair information acquisition process by a secondary host computer. FIGS. 6A-6C illustrate a data matching process and copy setting process by a secondary host computer.

In Step S110 (FIG. 4), the sub system selector 42 (FIG. 1) of the secondary host computer 10R selects a storage sub system 100 directly linked to the secondary host computer 10R. In this Embodiment, directly linked storage sub system 100R, which is directly linked to the secondary host computer 10R, is selected.

In Step S120 (FIG. 4), the sub system pair information acquirer 44 (FIG. 1) acquires the sub system pair information 150 belonging to the storage sub system 100 selected in the preceding step. A storage sub system 100 selected in the preceding step is sometimes referred to as a "selected storage sub system Ss." For example, when storage sub system 100R has been selected in the preceding Step S110, selected storage sub system Ss will be the storage sub system 100R, and the sub system pair information acquirer 44 will acquire the sub system pair information 150R belonging to storage sub system 100R. FIG. 5A depicts acquisition of sub system pair information 150R by the sub system pair information acquirer 44 (not shown) of secondary host computer 10R. Acquisition of sub system pair information 150 by the sub system pair information acquirer 44 will be described in detail later.

In Step S130 (FIG. 4), the sub system selector 42 (FIG. 1) identifies a copy pair defined by the sub system pair information 150 acquired in the preceding Step S120. In the example of FIG. 5A, since sub system pair information 150R (FIG. 3C) was acquired in the preceding Step S120, the sub system selector 42 identifies two copy pairs (Pr-3 and Pr-4) defined by the copy pair information included in the sub system pair information 150R. In FIG. 5A, the two copy pairs identified by the sub system selector 42 are enclosed by broken lines.

In Step S140 (FIG. 4), the sub system selector 42 (FIG. 1) determines whether there is a volume 122 in another storage sub system 100 making up the copy pair with the volume 122 in the selected storage sub system 100. This determination is made for the purpose of detecting whether there is an additional storage sub system 100 for which sub system pair information 150 should be acquired. If it is determined that there is, the routine proceeds to Step S150. On the other hand, if in Step S140 it is determined that there is not, the routine proceeds to Step S170. In the example in FIG. 5A, since the L12 volume making up copy pair Pr-3 is a volume 122 in another storage sub system (100L) different from storage sub system 100R, the routine proceeds from Step S140 to Step S150.

In Step S150 (FIG. 4), the sub system selector 42 (FIG. 1) determines whether sub system pair information 150 belonging to the "other storage sub system 100" in Step S140 has not yet been acquired. If in Step S150 it is decided that the information has not yet been acquired, the routine proceeds to Step S160. On the other hand, if in Step S150 it is decided that the information has already been acquired, the routine proceeds to Step S170. In the state depicted in FIG. 5A, since sub system pair information 150 belonging to the "other storage sub system 100" in Step S140, i.e. storage sub system 100L, has not yet been acquired, the routine proceeds from Step S150 to Step S160.

In Step S160 (FIG. 4), the sub system selector 42 (FIG. 1) selects the "other storage sub system 100" in Step S140, and returns to Step S120. In Step S120, the sub system pair information acquirer 44 (FIG. 1) acquires the sub system pair information 150 belonging to the storage sub system 100 selected in the preceding Step S160. In the state depicted in FIG. 5A, storage sub system 100L, which is the "other storage sub system 100" in Step S140, is selected. Then, the sub system pair information 150L belonging to the selected storage sub system 100L is acquired by the sub system pair information acquirer 44. FIG. 5B depicts acquisition of sub system pair information 150L by the sub system pair information acquirer 44 (not shown) of secondary host computer 10R.

Subsequently, this same process is executed repeatedly, with the secondary host computer 10R sequentially selecting storage sub systems 100 and acquiring sub system pair information 150 belong to the selected storage sub systems 100. In the example of FIGS. 5A-5C, once acquisition of sub system pair information 150P belonging to the storage sub system 100P shown in FIG. 5C has been completed, the sub system pair information acquirer 44 will have acquired sub system pair information 150 from all of the storage sub systems 100. Subsequently, in Step S150 (FIG. 4), it will be determined that sub system pair information 150L belonging to storage sub system 100L, which is the "other storage sub system 100" in Step S140, has already been acquired, and the routine will proceed on to Step S170.

In Step S170 (FIG. 4), the system pair information generator 46 (FIG. 1) generates system pair information on the basis of the acquired sub system pair information 150. Generation of system pair information is carried out by consolidating into one the copy pair information contained in all sub system pair information 150 acquired to that point. By so doing, there is generated system pair information having the same content as that depicted in FIG. 2A.

In Step S180 (FIG. 4), the secondary host computer 10R (FIG. 1) determines whether a copy pair whose copy status is uncompleted is present in computer system 1000. This determination is made for the purpose of discerning whether, when the secondary host computer 10R takes over tasks, data is identical between volumes 122 that make up a copy pair in the computer system 1000. The determination is made by referring to the copy status information in each set of copy information included in the system pair information generated by the system pair information generator 46. Herein, a copy pair having uncompleted copy status and data that is not identical between volumes 122 is referred to as an "uncompleted copy pair." In Step S180, if it is determined that an uncompleted copy pair exists, the routine proceeds to Step S190. On the other hand, in Step S180, if it is determined that not uncompleted copy pair exists, the routine proceeds to Step S200. FIG. 6A shows an example of copy status of copy pairs when the secondary host computer 10R takes over tasks. In the example of FIG. 6A, copy pair Pr-3 is an uncompleted copy pair. In this case, the routine will proceed to Step S190.

In Step S190 (FIG. 4), the secondary host computer 10R (FIG. 1) carries out a data matching process. The data matching process is a process for making stored data agree across volumes 122 that make up copy pairs in the computer system 1000. Specifically, the process is one of executing copying of uncompleted copy pairs in the computer system 1000, as well as executing copying of any other copy pairs copying of which is made necessary by copying of uncompleted copy pairs. By carrying out the data matching process, it is possible to produce a matched data condition in which identical data is stored in volumes 122 making up copy pairs in the computer system 1000, so that subsequently the secondary host computer 10R can carry out tasks from a state of matched data.

As noted, in the example of FIG. 6A copy pair Pr-3 is an uncompleted copy pair. In this case, data stored in three volumes 122, namely the P11 volume, L11 volume and L12 volume, will be identical to one another, while data stored in the R12 volume will not be the same as the data stored in the three volumes 122 mentioned above. Also, in this case data stored in the R11 volume will not be the same as the data stored in the three volumes 122 mentioned above.

In FIG. 6B shows an example of the content of the data matching process carried out by the secondary host computer 10R (FIG. 1) in such an instance. The secondary host computer 10R executes copying within the uncompleted copy pair, i.e. copy pair Pr-3, to make the data stored in the R12 volume identical to the data stored in the L12 volume. AT this time, since the data stored in the R12 volume is being updated, it becomes necessary to execute copying of data in copy pair Pr-4. Accordingly, the secondary host computer 10 next executes copying of copy pair Pr-4, to make the data stored in the R11 volume identical to the data stored in the R12 volume (i.e. data identical to the data stored in the L12 volume). By carrying out this data matching process, there is generated a matched data state in which identical data is stored in all five volumes, i.e. the P11 to R11 volumes.

In Step S200 (FIG. 4), the copy setting module 48 (FIG. 1) performs a copy setting process. The copy setting process is a process carried out in order to set the copy method, i.e. copy direction and copy type, for each copy pair. The copy setting process is carried out in accordance with an administrator instruction input from input device 13R (FIG. 1). For example, the copy setting module 48 may perform various settings such as modifying the copy direction of a copy pair, or modifying copy type from synchronous copy to asynchronous copy. In the example of FIG. 6C, there is shown an example in which a copy process to reverse the copy direction of each copy pair is performed. In this case, copying of data stored in the R11 volume sent from the secondary host computer 10R to the R12 volume, and copying of data stored in the R12 volume to the L12 volume, are carried out in succession. In this way, the secondary host computer 10R carries out remote copying of data.

Following is a description of acquisition of sub system pair information 150 by the sub system pair information acquirer 44. Acquisition of sub system pair information 150 by the sub system pair information acquirer 44 is carried out using a pair information acquisition command (hereinafter termed "acquisition command"). The acquisition command specifies routing information in an operand, and is issued to directly linked storage sub system 100R.

Here, routing information is information for indicating the selected storage sub system Ss and indicating a route from the secondary host computer 10R to the selected storage sub system Ss; it is stored in a predetermined area in memory 12R. FIGS. 7A-7C illustrate an example of routing information. In the routing information, the bottommost level indicates the selected storage sub system Ss, with the route to the selected storage sub system Ss indicated in order going from the topmost level to the bottommost level. FIG. 7A depicts routing information in an initial state. In the initial state, routing information contains only an identifier for directly linked storage sub system 100R. Sub system selector 42 repeatedly carries out selection of selected storage sub systems Ss in Step S110 to Step S160, with sub system selector 42 proceeding to add to the routing information an identifier identifying selected storage sub system Ss, each time that a new selected storage sub system Ss is selected. FIGS. 7B-7C show states in which identifiers identifying selected storage sub systems Ss have been added to routing information. As shown in the drawing, an identifiers identifying a newly added storage sub system Ss is appended to the bottommost level of the routing information. For example, where storage sub system 100P has been selected as the selected storage sub system Ss, the routing information assumes the state shown in FIG. 7C. In this case, storage sub system 100P at the bottommost level is indicated as the selected storage sub system Ss. The route to storage sub system 100P is shown as passing through storage sub system 100R and storage sub system 100L in that order.

Figure 8:
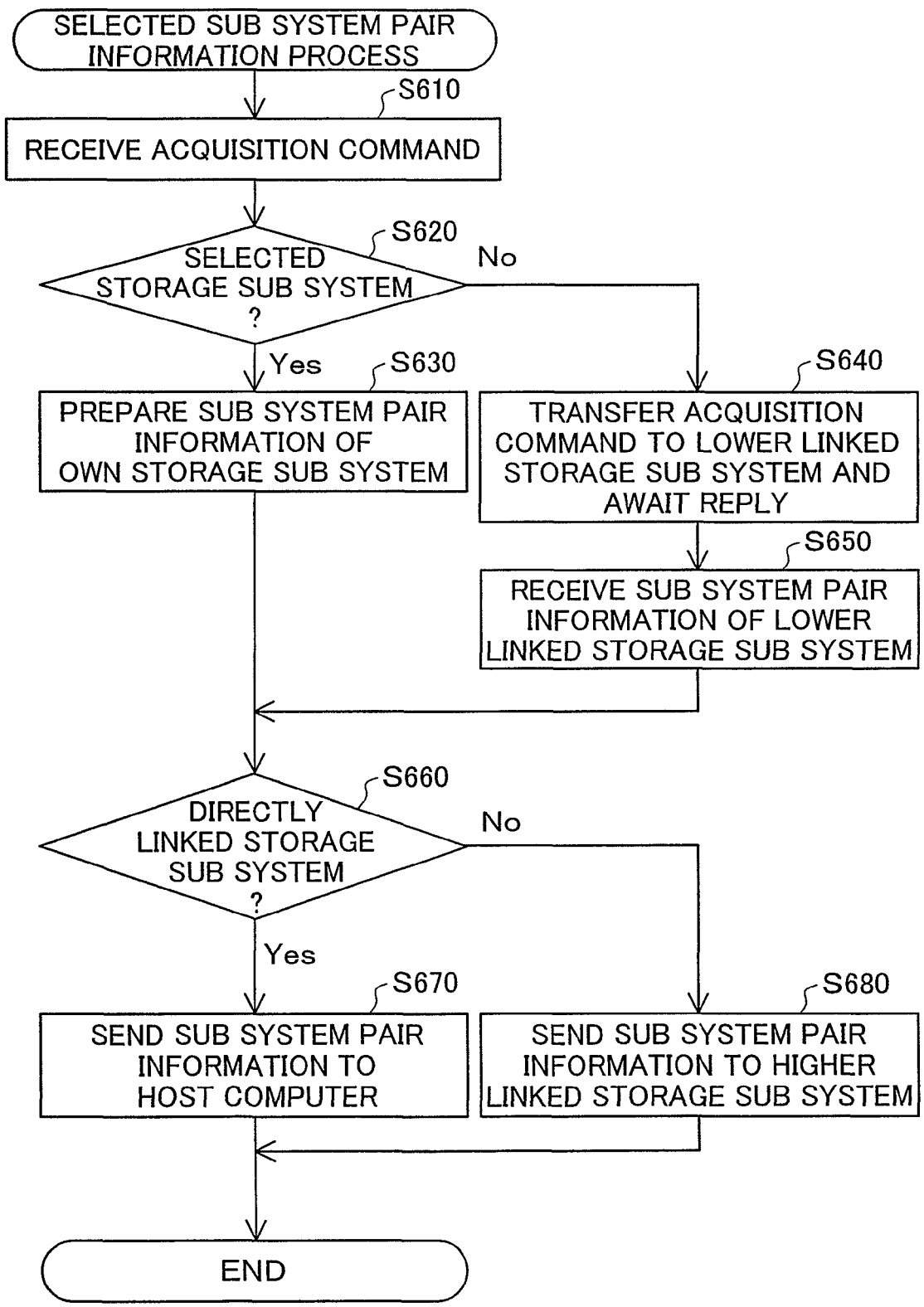
FIG. 8 is a flowchart showing the flow of a selected sub system pair information process by a storage sub system.

An acquisition command is issued to directly linked storage sub system 100R, but is transferred to the selected storage sub system Ss by means of a selected sub system pair information process described hereinbelow. FIG. 8 is a flowchart showing the flow of a selected sub system pair information process by a storage sub system 100.

In Step S610, the storage controller 110 (FIG. 1) of a storage sub system 100 receives an acquisition command. In Step S620, the storage controller 110 determines whether itself is the selected storage sub system Ss. The determination is made by ascertaining whether the identifier of the storage sub system 100 of the bottommost level of the acquisition command is an identifier indicating itself. In Step S620, if it is determined to be the selected storage sub system Ss, the routine proceeds to Step S630 wherein the storage controller 110 prepares the sub system pair information 150 of its storage sub system for use in reply. On the other hand, if in Step S630 it is determined not to be the selected storage sub system Ss, the routine proceeds to Step S640, and the storage controller 110 transfers the acquisition command to the next lowest level linked storage sub system 100, and awaits a reply.

In Step S660, the storage controller 110 determines whether itself is a directly linked storage sub system 100. In Step S660, if it is determined to be a directly linked storage sub system 100, the routine proceeds to Step S670 wherein the storage controller 110 sends the prepared sub system pair information 150 to the secondary host computer 10R, and terminates the process. On the other hand, if it is determined in Step S660 not to be a directly linked storage sub system 100, the routine proceeds to Step S680 wherein the storage controller 110 sends the prepared sub system pair information 150 to the next highest level linked storage sub system 100.

In Step S650, the storage controller 110 receives sub system pair information 150 sent from the next lowest level linked storage sub system 100. It then proceeds to Step S660.

By means of the process described above, the sub system pair information acquirer 44 can acquire sub system pair information 150 for selected storage sub systems Ss.

As described hereinabove, the secondary host computer 10R in the computer system 1000 of this Embodiment can generate system pair information and in accordance with system pair information so generated take over control of data copying in the computer system 1000 from the primary host computer 10P.

Further, the secondary host computer 10R in the computer system 1000 of this Embodiment can generate a state in which identical information is stored among volumes 122 making up copy pairs in the computer system 1000, before initiating control of data copying in the computer system 1000.

Additionally, the secondary host computer 10R of this Embodiment can set different copy methods as the copy method normally used, to control data copying in the computer system 1000.

B. Embodiment 2

Figure 9:
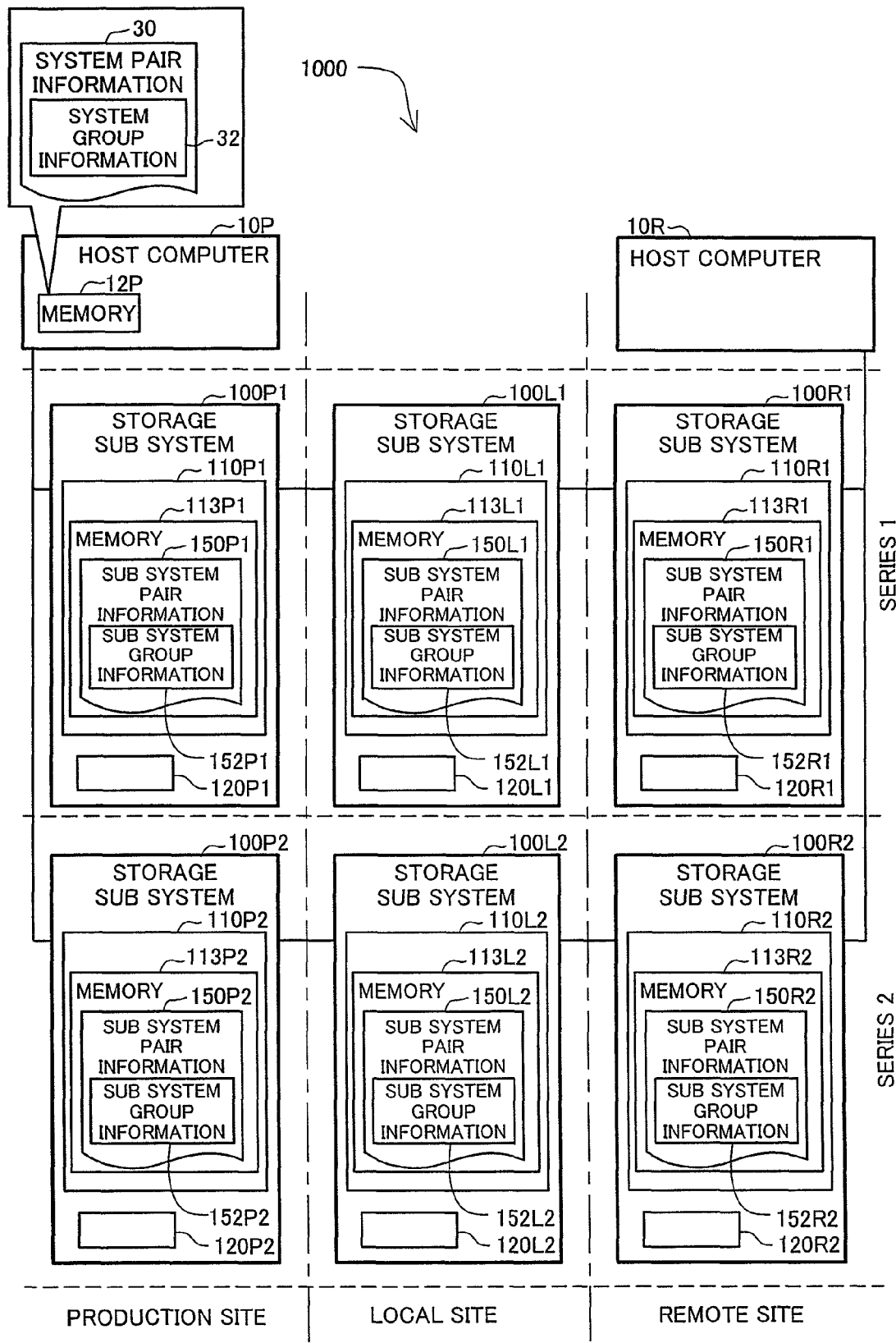
FIG. 9 is a block diagram showing arrangement of a computer system in Embodiment 2.

FIG. 9 is a block diagram showing arrangement of a computer system in Embodiment 2. A point of difference from Embodiment 1 shown in FIG. 1 is that two storage sub systems 100 are installed at each of the sites. Another point of difference from Embodiment 1 is that in Embodiment 2, system group information 32 is included in the system pair information 30 stored in memory 12P provided to the primary host computer 10P, and sub system group information 152 is included in sub system pair information 150 stored in memory 113 provided to each storage sub system 100. In other respects, the example is the same as Embodiment 1. In FIG. 9, points identical to Embodiment 1 have been partially omitted from the drawing.

In Embodiment 2, the two storage sub systems (100P1 and 100P2) at the production site are each directly linked to the primary host computer 10P. The two storage sub systems (100R1 and 100R2) at the remote site are each directly linked to the secondary host computer 10R. Storage sub system 100P1 is connected to storage sub system 100L1, and storage sub system 100P2 to storage sub system 100L2. Similarly, storage sub system 100R1 is connected to storage sub system 100L1, and storage sub system 100R2 to storage sub system 100L2.

In this way, in the computer system 1000 of this Embodiment storage sub systems 100 situated at each site are series connected one-to-one. Herein, this group of series-connected storage sub systems 100 is termed a "series". In the computer system 1000 of Embodiment 2, there are two series, i.e. Series 1 and Series 2, with remote copying being possible within each series.

In Embodiment 2, in addition to a symbol identifying the site at which an element is located, which in Embodiment 1 is suffixed to symbols indicating host computers and storage sub systems 100 proper, component elements, and various kinds of programs and data, there is also appended a symbol that identifies the series. For example, storage sub systems 100 at each site making up Series 1 are denoted as storage sub system 100P1, storage sub system 100L1, and storage sub system 100R1. Additionally, in the description herein, in instances where it is not necessary to distinguish among storage sub systems of specific series, the series-identifying symbol suffix may be omitted.

In the computer system 1000 of Embodiment 2, there is defined a copy group composed of a plurality of copy pairs, with copying within copy pairs included within the copy group being executed at the same given timing. In the computer system 1000 of this Embodiment, copy operations in a plurality of copy pairs are simplified in this way. This copy group can be composed of a number of copy pairs within the same given series, or composed of a number of copy pairs belonging to different series. A copy group is defined by means of copy group information that contains information for identifying a number of copy pairs that make up the copy group. Copying within copy pairs included within a copy group need not be executed at the same given timing.

Figures 10A, 10B:
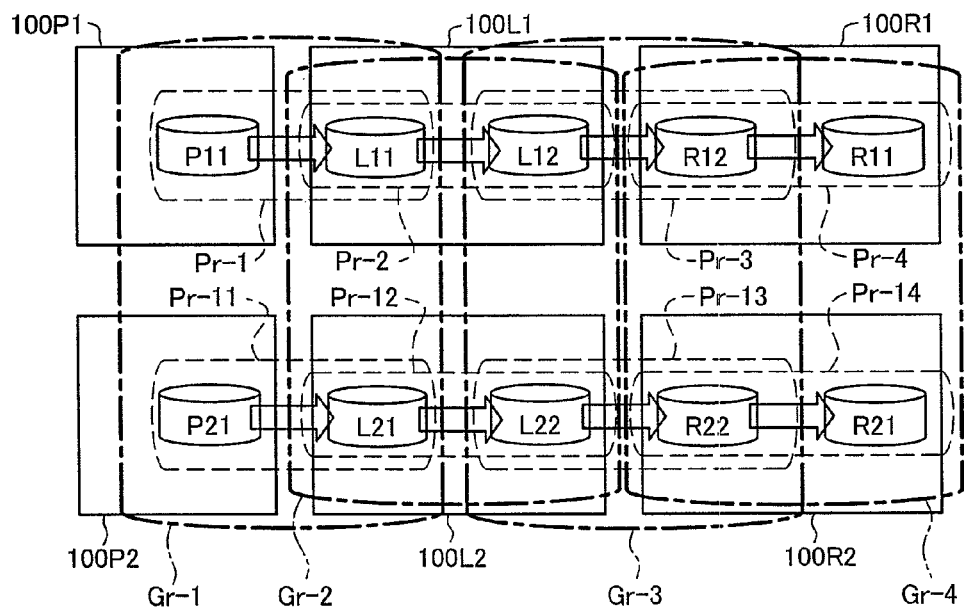
FIGS. 10A-10B illustrate an example of system pair information including system group information.

System group information 32 that includes all copy group information in the computer system 1000 is contained in the system pair information 30 that is stored in the memory 12P provided to the primary host computer 10P. FIGS. 10A-10B illustrate an example of system pair information including system group information. In FIG. 10A is shown an example of contents of system pair information 30 that contains system group information 32.

Each row of system group information 32 contained in the system pair information 30 shown in FIG. 10A indicates a copy group composed of several copy pairs identified by pair numbers. That is, each row of system group information 32 constitutes copy group information defining a copy group. For example, the first row of system group information 32 indicates that copy group Gr-1 having group number Gr-1 is composed of two copy pairs, the two copy pairs being the two copy pairs Pr-1 and Pr-11. System group information 32 includes copy group information defining all copy groups within the computer system 1000. In the computer system 1000 of this Embodiment, four copy groups are defined by means of the four sets of copy group information included in the system group information 32 shown in FIG. 10A.

As shown in FIG. 10A, the system pair information 30 of this Embodiment, like that of Embodiment 1, includes all copy pair information in the computer system 1000. Accordingly, it is possible by means of system group information 32 included in the system pair information 30 to define multiple copy pairs making up a copy group, and additionally to define multiple volumes 122 making up the plurality of copy pairs. In FIG. 10B, the four copy groups defined by the system group information 32 are shown enclosed by dashed lines.

System group information 32 is generated by the primary host computer 10P executing the copy operation program 20P (FIG. 1) in accordance with an administrator instruction input from input device 13P (FIG. 1).

The sub system pair information 150 stored in memory 113 of storage sub system 100 (FIG. 9) includes sub system group information 152. Sub system group information 152 includes copy group information which, of the copy group information, defines a copy group in which at least one of the volumes 122 making up a copy pair in the copy group is a volume 122 within the storage sub system 100 itself. That is, a storage sub system 100 has, by way of sub system group information 152, copy group information defining all copy groups that include a volume 122 belonging to itself.

Storage of sub system group information 152 in a storage sub system 100 may be carried out using a sub system group information store command (hereinafter "store command") generated by the primary host computer 10P. This store command is a command to store sub system group information 152 in a storage sub system 100. The process of storing sub system group information 152 in a storage sub system 100 using a store command will be described later.

Figure 11:
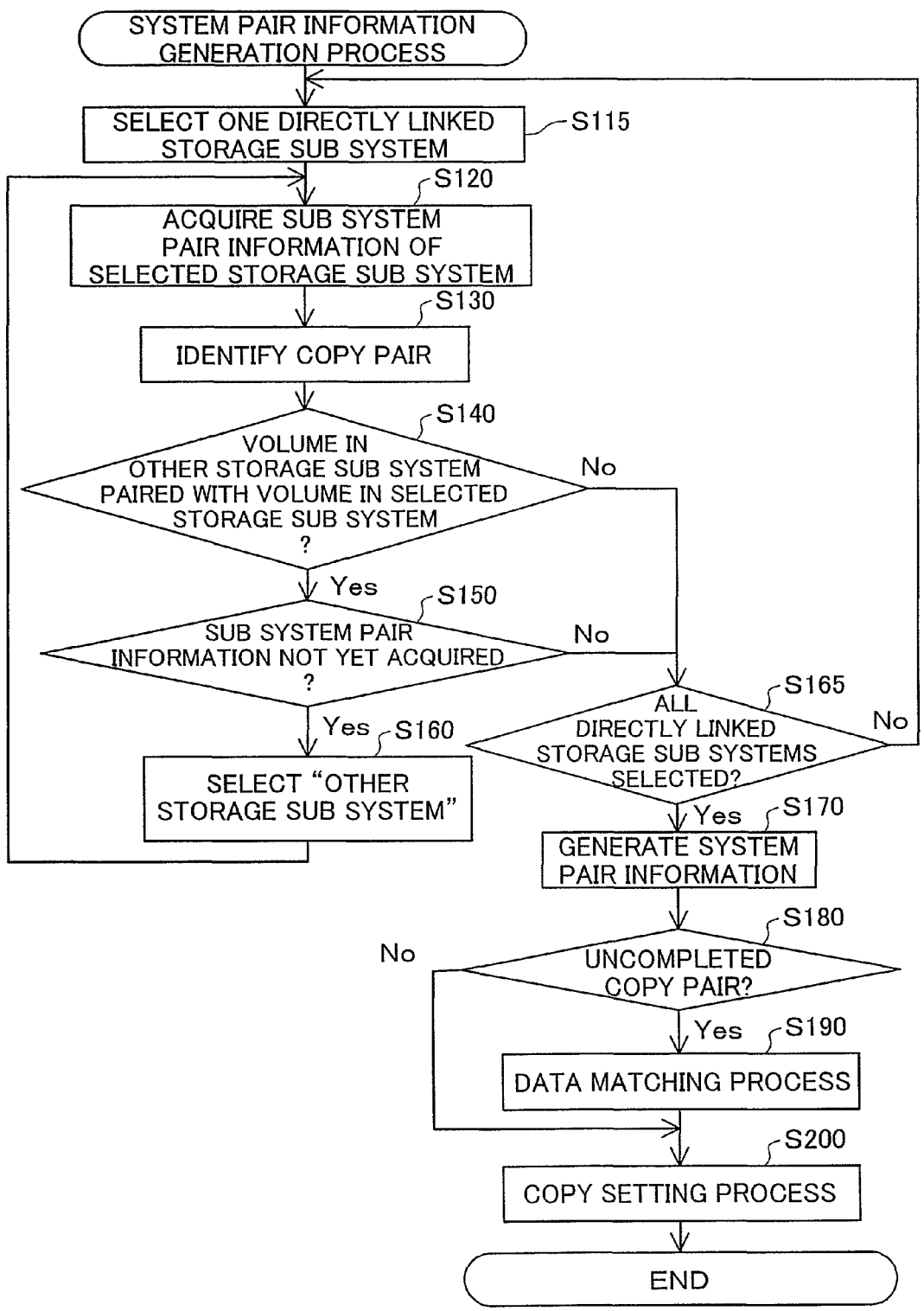
FIG. 11 is a flowchart showing the flow of a system pair information generation process by a secondary host computer.

FIG. 11 is a flowchart showing the flow of a system pair information generation process by a secondary host computer. A point of difference from Embodiment 1 shown in FIG. 4 is that in Embodiment 2, a plurality of storage sub systems 100 are directly linked to the secondary host computer 10R, so that the secondary host computer 10R repeatedly executes storage sub system 100 selection and acquisition of sub system pair information 150, for each series to which each directly linked storage sub system 100 belong. Another point of difference in Embodiment 2 is that the acquired sub system pair information 150 includes sub system group information 152.

In Step S115, the sub system selector 42 (FIG. 1) selects one directly linked storage sub system 100. Next, the sub system pair information acquirer 44 (FIG. 1) executes Step S120 to Step S160 analogously to Embodiment 1, and acquires sub system pair information 150 from a storage sub system 100 in the series to which the directly linked storage sub system 100 selected in Step S115 belongs.

When acquisition of sub system pair information 150 for one series has been completed, in Step S140 or Step S150, a determination of "No" is made, and the routine proceeds to Step S165.

In Step S165, the sub system selector 42 (FIG. 1) determines whether all directly linked storage sub systems 100 have been selected. If the sub system selector 42 determines that not all directly linked storage sub systems 100 have been selected yet, it returns to Step S115 and selects one of the still unselected directly linked storage sub systems 100. Then, in the same manner as previously, the sub system pair information acquirer 44 acquires sub system pair information 150 from a storage sub system 100 in the series to which the selected directly linked storage sub system 100 belongs.

On the other hand, if the sub system selector 42 determines that all directly linked storage sub systems 100 have been selected, it proceeds to Step S170. Subsequently, Step S170 to Step S200 are executed in the same manner as in Embodiment 1.

Also, since in Embodiment 2 the acquired sub system pair information 150 includes sub system group information 152, the system pair information generator 46 (FIG. 1) on the basis of this sub system group information 152 generates system pair information 30 that includes system group information 32.

In the manner described above, the secondary host computer 10R in the computer system 1000 of Embodiment 2 can generate system pair information 30 that includes system group information 32, even when copy groups are defined in the computer system 1000. Accordingly, the secondary host computer 10R of this Embodiment can take over control of data copying in the computer system 1000 from the primary host computer 10P, in accordance with the generated system pair information 30 that includes system group information 32.

Figure 12:
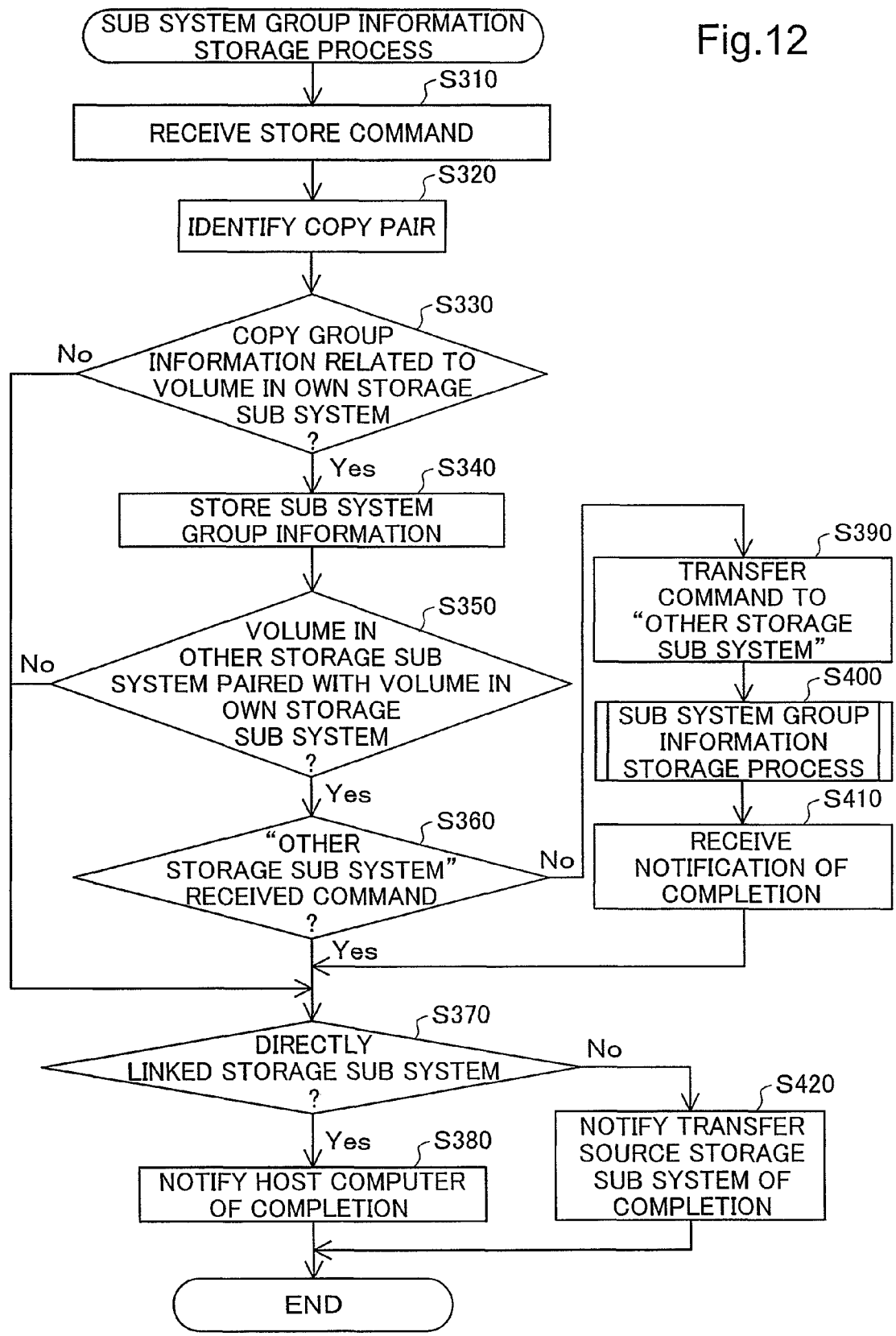
FIG. 12 is a flowchart showing the flow of a process for storing sub system group information in a storage sub system.

The process for storing sub system group information 152 in a storage sub system 100 using a store command will now be described. FIG. 12 is a flowchart showing the flow of a process for storing sub system group information in a storage sub system. The process for storing sub system group information 152 in a storage sub system 100 is executed on a series-by-series basis, when storage sub systems 100 sequentially receive a store command and store sub system group information 152 in their memory 113 in accordance with a received store command. That is, store commands are sequentially transferred on a series-by-series basis, and storage sub systems 100 receiving store command sequentially execute the sub system group information storage process shown in FIG. 12. The primary host computer 10P initially transmits a store command to the directly linked storage sub systems 100 of each series.

Within the memory 113 of each storage sub system 100 there is already stored sub system pair information 150 that does not contain any sub system group information 152. The aforementioned store command contains system pair information 30 that includes system group information 32.

In Step S310, the storage controller 110 of storage sub system 100 receives a store command. In Step S320, the storage controller 110, on the basis of the system pair information 30 included in the received store command, identifies a copy pair. Copy pair identification includes identification of copy pairs making up copy groups included in the system pair information 30, and identification of volumes 122 making up the copy pairs.

In Step S330, the storage controller 110 determines whether there is copy group information identifying a copy group that contains a copy pair including a volume 122 within the storage sub system 100 itself. In Step S330, if it is so determined, the routine proceeds to Step S340 wherein the storage controller 110 stores the copy group information in memory 113, as sub system group information 152. On the other hand, if it is not so determined in Step S330, the routine proceeds to Step S370.

In Step S350, the storage controller 110 determines whether there is a volume 122 within another storage sub system 100 making up a copy pair with the volume 122 within the storage sub system 100 itself. This determination is made for the purpose of ascertaining whether there is another storage sub system 100 to which the store command should be transferred. In Step S350, if it is determined that there is, the routine proceeds to Step S360. On the other hand, if it is determined in Step S350 that there is not, the routine proceeds to Step S370.

In Step S360, the storage controller 110 determines whether the "other storage sub system 100" in Step S350 has finished receiving the store command. This determination is possible, for example, by preparing a "Storage Complete" identifier area for writing an identifier indicating that the storage sub system 100 has received the store command; and when the storage controller 110 receives a store command, writing this identifier to its own storage sub system 100. The storage controller 110 can then make the determination by verifying whether the identifier of the "other storage sub system 100" is included in the Storage Complete identifier area. In Step S360, if it is determined that reception is not complete, the routine proceeds to Step S370. On the other hand, in Step S360, if it is determined that reception is not completed, the routine proceeds to Step S390.

In Step S390, the storage controller 110 transfers the store command to the "other storage sub system 100" in Step S350. In Step S400, in the "other storage sub system 100" receiving the transferred store command, a sub system group information storage process is carried out. This sub system group information storage process means the sub system group information storage process shown in FIG. 12. In this way, a storage sub system 100 receiving a store command executes a sub system group information storage process, as well as transferring the store command to "other storage sub system 100." The "other storage sub system 100" receiving the transferred store command similarly executes a sub system group information storage process, as well as transferring the store command to "other storage sub system 100."

As the above process is repeatedly executed, during the sub system group information storage process in a certain storage sub system 100, a determination of "No" is made in Step S350 or a determination of "Yes" is made in Step S360, whereupon the routine proceeds to Step S370.

In Step S370, the storage controller 110 determines whether itself is a directly linked storage sub system 100. In Step S370, if it determines that it is a directly linked storage sub system 100, it proceeds to Step S380 wherein the storage controller 110 sends completion notification to the primary host computer 10P. On the other hand, if in Step S370 it determines that it is not a directly linked storage sub system 100, it proceeds to Step S420 wherein the storage controller 110 sends completion notification to the transfer source of the store command.

In Step S410, the storage controller 110 receives a completion notification sent from the storage sub system 100 which transferred the store command. The routine then proceeds to Step S370 described above.

In the above manner, sub system group information 152 is stored in memory 113 in storage sub systems 100.

C. Embodiment 3

Figure 13:
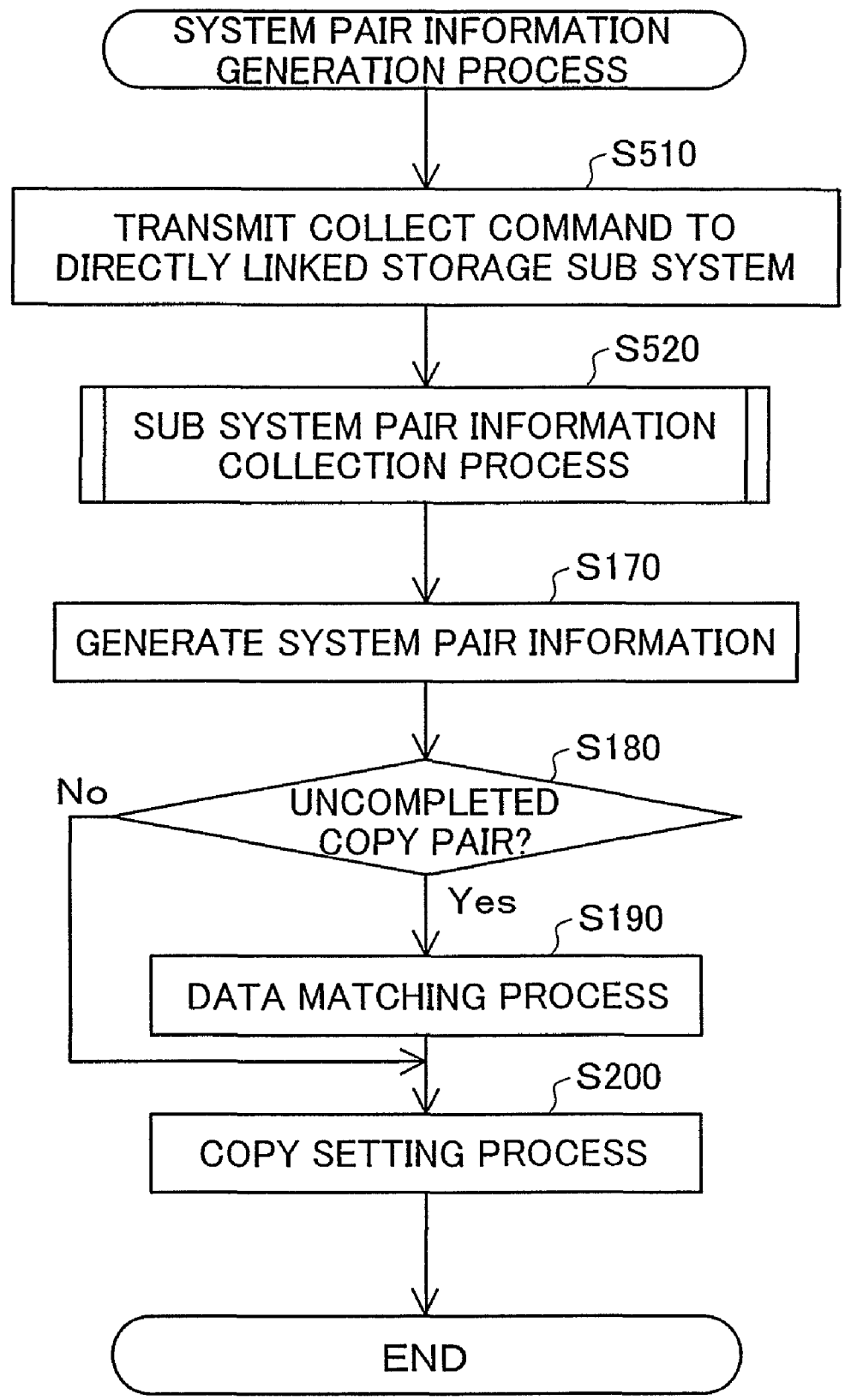
FIG. 13 is a flowchart showing the flow of a system pair information generation process by a secondary host computer in Embodiment 3.

FIG. 13 is a flowchart showing the flow of a system pair information generation process by a secondary host computer in Embodiment 3. A point of difference from Embodiment 1 shown in FIG. 4 is that Step S510 and Step S520 are executed instead of Step S110 to Step S160 in FIG. 4. In other respects, the process is the same as Embodiment 1.

In Embodiment 3, the method of acquiring sub system pair information 150 by secondary host computer 10R differs from that of Embodiment 1. In Embodiment 1, the secondary host computer 10R sequentially selects storage sub systems 100, and acquires sub system pair information 150 from selected storage sub systems 100. In Embodiment 3, on the other hand, the secondary host computer 10R transmits a sub system pair information collection command (hereinafter "collect command") to directly linked storage sub systems 100, and receives sub system pair information 150 collected by the directly linked storage sub systems 100 and other storage sub systems 100 in response to the collect command, in order to acquire sub system pair information 150.

In Step S510 (FIG. 13), the sub system pair information acquirer 44 (FIG. 1) generates a collect command, and transmits the generated collect command to directly linked storage sub system 100R (FIG. 1). In Step S520, a sub system pair information collection process is carried out by storage sub system 100 in accordance with the collect command.

Figure 14:
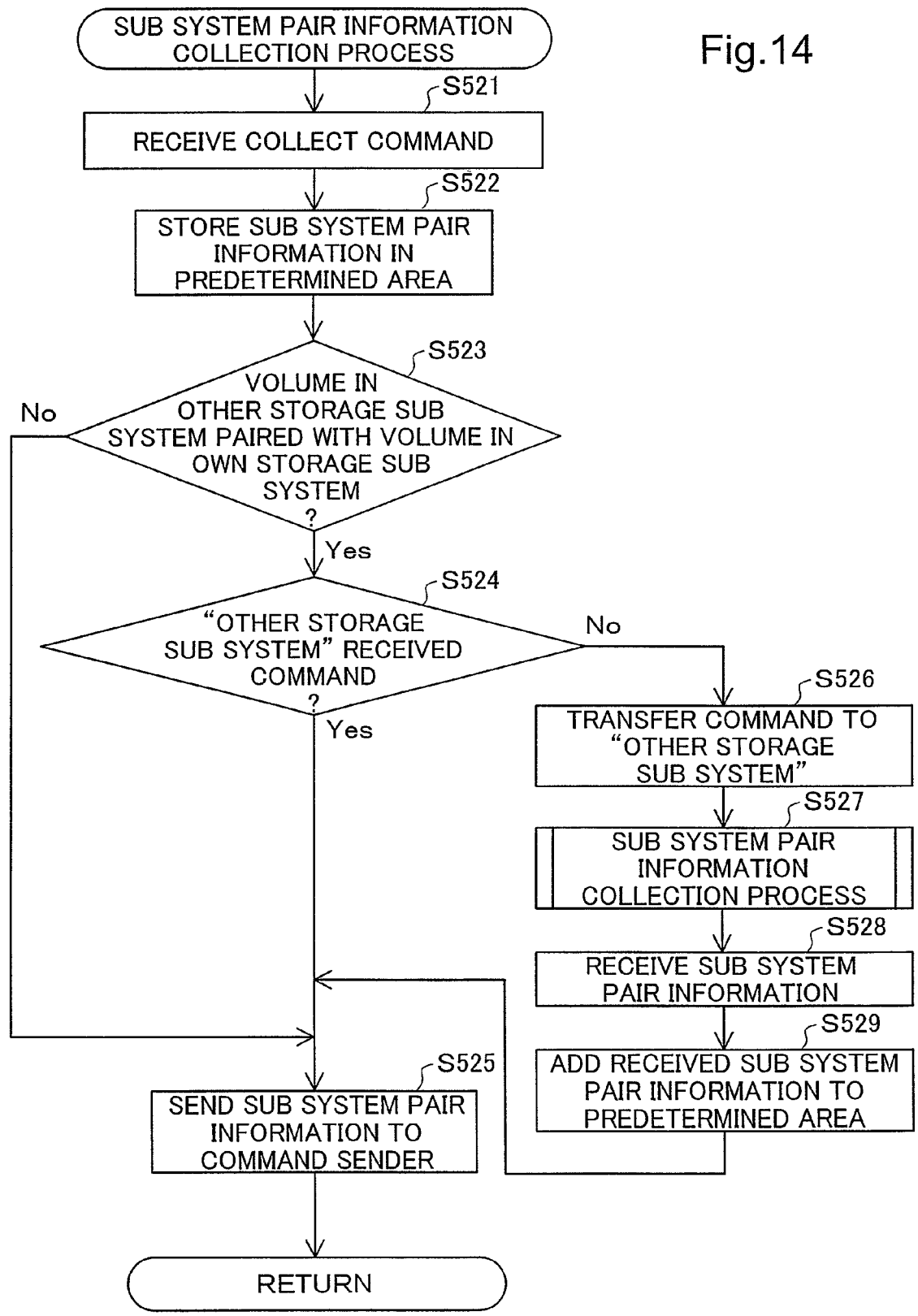
FIG. 14 is a flowchart showing the flow of a sub system pair information collection process by a storage sub system.

FIG. 14 is a flowchart showing the flow of a sub system pair information collection process by a storage sub system. As will be described later, the sub system pair information collection process shown in FIG. 14 is initially executed by directly linked storage sub system 100R once it has received a collect command, but is subsequently executed by another storage sub system 100 receiving the collect command transferred to it by the directly linked storage sub system 100R.

In Step S521, the storage controller 110 (FIG. 1) of storage sub system 100 receives a collect command. In Step S522, the storage controller 110 having received the collect command takes the sub system pair information 150 stored in memory 113 (FIG. 1) and stores it as outgoing sub system pair information 150 in a predetermined area in memory 113 set aside for outgoing sub system pair information 150.

In Step S523, the storage controller 110 identifies the copy pair defined by the copy pair information contained in the sub system pair information 150, and determines whether in other storage sub system 100 there is a volume 122 in that makes up the copy pair with the volume 122 in the storage sub system 100 itself. This determination is made in order to ascertain whether there is other storage sub system 100 to which the collect command should be transferred. In Step S523, if it is determined that there is, the routine proceeds to Step S524. On the other hand if in Step S523 it is determined that there is not, the routine proceeds to Step S525.

In Step S524, the storage controller 110 determines whether the "other storage sub system 100" in Step S523 has finished receiving the collect command. This determination is possible, for example, by preparing a "Reception Complete" identifier area for writing an identifier that indicates that the collect command has been received by storage sub system 100, and when the storage controller 110 receives a collect command, writing this identifier to its own storage sub system 100. The storage controller 110 can then make the determination by verifying whether the identifier of the "other storage sub system 100" is included in the Reception Complete identifier area. In Step S524, if it is determined that reception is completed, the routine proceeds to Step S525. On the other hand, in Step S524, if it is determined that reception is not complete, the routine proceeds to Step S526.

In Step S526, the storage controller 110 transfers the collect command to the "other storage sub system 100" in Step S523. In Step S527, in the "other storage sub system 100" receiving the transferred collect command, a sub system pair information collection process is carried out. This sub system pair information collection process means the sub system pair information collection process shown in FIG. 14. In this way, in Embodiment 3, a storage sub system 100 receiving a collect command executes a sub system pair information collection process, as well as transferring the collect command to "other storage sub system 100." The "other storage sub system 100" receiving the transferred collect command similarly executes a sub system pair information collection process, as well as transferring the collect command to "other storage sub system 100."

As the above process is repeatedly executed, during the sub system pair information collection process in a given storage sub system 100, a determination of "No" will be made in Step S523 or a determination of "Yes" will be made in Step S524, whereupon the routine proceeds to Step S525.

In Step S525, the storage controller 110 transmits, to the storage sub system 100 which originally transmitted the collect command, outgoing sub system pair information 150 stored in a predetermined area in memory 113 in Step S522. For example, the storage controller 110 of the storage sub system 100 which in Step S526 received the transferred collect command and carried out the sub system pair information collection process will transmit sub system pair information 150 to the storage sub system 100 which transferred the collect command to it. At this time, the routine returns to Step S527, and proceeds to the next Step S528.

In Step S528, the storage controller 110 receives the outgoing sub system pair information 150 sent from the collect command-transferring storage sub system 100 in Step S525. In Step S529, the storage controller 110 additionally stores the received outgoing sub system pair information 150, in a predetermined area of memory 113 in which outgoing sub system pair information 150 for its own storage sub system 100 has already been stored in Step S522. Accordingly, memory 113 now contains outgoing sub system pair information 150 for its own storage sub system 100, and outgoing sub system pair information 150 received from the storage sub system 100 which is transferred the collect command. The routine then returns to Step S525, and transmits the outgoing sub system pair information 150 stored in memory 113 (i.e. both the outgoing sub system pair information 150 for its own storage sub system 100, and outgoing sub system pair information 150 received from the storage sub system 100 which is transferred the collect command) to the storage sub system 100 which sent the collect command.

In the above manner, the process of transmitting outgoing sub system pair information 150 from a storage sub system 100 to which a collect command has been transferred to the storage sub system 100 which initially transferred the collect command is repeated, until finally outgoing sub system pair information 150 for all storage sub systems 100 is stored in memory 113R of directly linked storage sub system 100R. Subsequently, in Step S525 described previously, the storage controller 110R of directly linked storage sub system 100R sends the outgoing sub system pair information 150 for all storage sub systems 100 stored in memory 113R to the secondary host computer 10R, and returns to Step S520 of FIG. 13.

After returning to Step S520 of FIG. 13, the secondary host computer 10R uses the acquired sub system pair information 150 to perform the processes of Step S170 to Step S200 and generate system pair information. The specifics of the processes of Step S170 to Step S200 are the same as in Embodiment 1.

In the manner described above, the secondary host computer 10R of the computer system 1000 of Embodiment 3 is able to generate system pair information.

D: Variations

The invention is not limited to the embodiments set forth hereinabove, and may be reduced to practice in various modes without departing from the scope and spirit thereof. The following variations are possible, for example.

D1. Variation 1

The arrangement of computer system 1000 in the preceding Embodiments is merely exemplary, with various other arrangements of the computer system 1000 being possible. For example, in the preceding Embodiments, computer system 1000 is composed of three sites, namely, a production site, local site, and remote site; however, computer system 1000 could instead be composed of two sites, or four or more sites. Geographical relationships among sites are arbitrary, it being possible to have any relationship.

Furthermore, whereas in the preceding Embodiments, one or two storage sub systems 100 are provided at each site, it would be for three or more storage sub systems 100 to be provided at each site.

Additionally, the number of storage sub systems 100 located at a site could differ among sites. For example, in FIG. 9, it would be possible for the remote site storage sub systems 100R1 and 100R2 to instead be a single storage sub system 100, and for the local site storage sub system 100L1 to instead be two storage sub systems 100. Accordingly, an arrangement whereby a single storage sub system 100 is included in a number of different series is also possible, as is an arrangement whereby a multiplicity of storage sub systems 100 at a given site are included in a same given series.

In Embodiment 2 described hereinabove, there was described an example wherein the number of storage sub systems 100 at each site included in a single copy group is the same; however, the number of storage sub systems 100 included in a single copy group could differ on a site-by-site basis. For example, in FIG. 10B, it would be possible for storage sub system 100P1 and storage sub system 100P2 to be the same single storage sub system 100, so that the number of storage sub systems 100 included in copy group Gr-1 is one at the production site, and two at the local site.

Additionally, whereas in the preceding Embodiments, the secondary host computer 10R is situated at a remote site, the secondary host computer 10R could instead be situated at the local site, production site or other site. While the secondary host computer 10R is here directly linked to the remote site storage sub systems 100, it could instead be directly linked to storage sub systems 100 at the local site, production site or other site. The secondary host computer 10R may also be connected to each of a number of storage sub systems 100 installed at a number of sites. The secondary host computer 10R may be the same host computer 10 as the primary host computer 10P.

D2. Variation 2

Content of the system pair information 30, sub system pair information 150, system group information 32, and sub system group information 152 (hereinafter termed "sets of information") used in the preceding Embodiments is merely exemplary, it being possible for the sets of information to include other content, or to omit some of the content of the sets of information taught in the Embodiments. For example, sets of information could include the date and time the set of information was generated, or sets of information could omit copy status information.

D3. Variation 3

In Embodiment 2 described hereinabove, system pair information 30 includes system group information 32; however, system group information 32 could instead be generated separately from system pair information 30, and these stored separately in predetermined areas of memory 12.

Similarly, whereas in Embodiment 2 hereinabove, sub system pair information 150 includes sub system group information 152, sub system group information 152 could instead be generated separately from sub system pair information 150, and these stored separately in predetermined areas of memory 113.

Whereas in Embodiment 2 hereinabove, sub system group information 152 is stored in memory 113 of storage sub system 100, it would be possible instead to be stored in a predetermined area in volume 122, for example.

D4. Variation 4

In the Embodiments hereinabove, the host computer 10R acquires sub system pair information 150 from all storage sub systems 100 in the computer system 1000, it would instead be possible to establish a condition for acquisition of sub system pair information 150, and to have it acquire sub system pair information 150 only in instances where the condition is met. In particular, in Embodiment 3 hereinabove, when sub system pair information 150 is collected by means of a sub system pair information collect command, there is a possibility that normal data processing tasks of the computer system 1000 could be disrupted if, for example, the area using memory 113 of storage sub system 100 is too large, or the frequency of use of communication lines among storage sub systems 100 is too high. To avoid such a situation, there could be established a condition for acquisition of sub system pair information 150, so that only required sub system pair information 150 is acquired. Examples of conditions for acquisition of sub system pair information 150 are, for example, that the number of collected copy pairs not exceed some maximum number; that sub system pair information 150 belong to a designated storage sub system 100; that copy pair information define a copy pair originating from a particular volume 122; or that generation time be within a specified range.

D5. Variation 5

In Embodiment 1 there was described an example in which the secondary host computer 10R actively carries out a data matching process; however, the data matching process could instead be executed by means of some other method. For example, the secondary host computer 10R could be set up so as to await execution, by the storage controller 110 of storage sub system 100, of copying within an uncompleted copy pair and copying within a copy pair which has been made necessary by execution of copying within the uncompleted copy pair. It is possible to generate a condition of matched data in this manner as well.

D6. Variation 6

In the Embodiments hereinabove, the process of storing sub system group information 152 in storage sub systems 100 is carried out by means of a store command, but could instead be carried out by some other method. For example, the primary host computer 10P, on the basis of system pair information 30 including system group information 32, could generate for each storage sub system 100 sub system group information 152 for storage, and send this information to each storage sub system 100.

What is claimed is:

1. A computer managing a first storage subsystem including a first volume and a second storage subsystem including a second volume, comprising:

a memory to store a program;

an interface coupled to the first storage subsystem; and a processor to execute the program, which carries out a task with accessing the first volume after a status of the first volume changes from a copy destination of the second volume, wherein the processor generates system pair information indicating a definition of a copy pair between the first volume and the second volume based on first subsystem pair information, stores the system pair information in the memory, and controls the copy pair based on the system pair information, and wherein the first subsystem pair information is received from the first storage subsystem, indicates an identifier of the first volume, and indicates an identifier of the second volume as corresponding to the first volume.

2. A computer according to claim 1, wherein the system pair information further indicates another definition of another copy pair between two volumes, at least one of which is in a third storage subsystem which is different from the first storage subsystem and the second storage subsystem, wherein creation of the system pair information is further based on a third subsystem pair information, and wherein the third subsystem pair information is received from the third storage subsystem, and indicates identifiers of the two volume in the another copy pair.

3. A computer according to claim 2, wherein one of the two volumes is the second volume, and wherein the reception of the first subsystem information is before the reception of the third subsystem information.

4. A method for a computer managing a first storage subsystem coupled to the computer and a second storage subsystem coupled to the first storage subsystem, comprising:

executing a program which carries out a task with accessing a first volume included in the first storage subsystem after a status of the first volume changes from a copy destination of the second volume;

receiving first subsystem pair information from the first storage subsystem, which indicates an identifier of the first volume, and indicates an identifier of the second volume as corresponding to the first volume as a copy pair;

generating system pair information indicating a definition of the copy pair between the first volume and the second volume based on the first subsystem pair information;

storing the system pair information; and controlling the copy pair based on the system pair information.

5. A method according to claim 4, wherein the system pair information further indicates another definition of another copy pair between two volumes, at least one of which is in a third storage subsystem which is different from the first storage subsystem and the second storage subsystem, wherein the creation of the system pair information is further based on a third subsystem pair information, and the method further comprising:

receiving the third subsystem pair information from the third storage subsystem, which indicates identifiers of the two volume in the another copy pair.

6. A method according to claim 5, wherein one of the two volumes is the second volume, and wherein the reception of the first subsystem information is before the reception of the third subsystem information.

7. A computer-readable media for a computer managing a first storage subsystem coupled to the computer and a second storage subsystem coupled to the first storage subsystem, and executing a program, which carries out a task with accessing a first volume included in the first storage subsystem after a status of the first volume changes from a copy destination of the second volume, comprising:

a receiving code causing the computer to receive first subsystem pair information from the first storage subsystem, which indicates an identifier of the first volume, and indicates an identifier of the second volume as corresponding to the first volume as a copy pair;

a generating code causing the computer to generate system pair information indicating a definition of the copy pair between the first volume and the second volume based on the first subsystem pair information, and to store the system pair information; and a controlling code causing the computer to control the copy pair based on the system pair information.

8. A computer-readable media according to claim 7, wherein the system pair information further indicates another definition of another copy pair between two volumes, at least one of which is in a third storage subsystem which is different from the first storage subsystem and the second storage subsystem, wherein the creation of the system pair information is further based on a third subsystem pair information, and wherein the receiving code further causes the computer to receive the third subsystem pair information from the third storage subsystem, which indicates identifiers of the two volume in the another copy pair.

9. A computer-readable media according to claim 8, wherein one of the two volumes is the second volume, and wherein the reception of the first subsystem information is before the reception of the third subsystem information.

* * * * *